INVENTOR
LEONARD R. KAHN
BY Graybeal, Cole & Barnard
ATTORNEYS

INVENTOR.
LEONARD R. KAHN

BY Graybeal, Cole & Barnard
ATTORNEYS 3,528,012

PHASE CONTROL CIRCUITRY FOR PLACING DIVERSELY RECEIVED SIGNALS IN PHASE COINCIDENCE

Leonard R. Kahn, Freeport, N.Y., assignor to Kahn Research Laboratories, Inc., Freeport, N.Y., a corporation of New York Filed Feb. 13, 1967, Ser. No. 615,473
Int. Cl. H04b 7/08
U.S. Cl. 325—304 16 Claims

ABSTRACT OF THE DISCLOSURE

System for placing diversely received electromagnetic signals in phase coincidence by dynamically selecting or establishing a phase reference signal, and providing phase coincidence among the incoming signals in response to the phase of the reference signal. In one embodiment the phase of the reference signal is determined by the phase of the strongest incoming signal. In an alternative embodiment circuitry is provided for establishing the phase of the reference signal in accordance with the phase difference between incoming signals, either by averaging or as a function of the square of the ratio of the signal strengths.

BACKGROUND OF THE INVENTION

The present invention relates generally to systems for combining electrical signals, such as in so-called diversity combining receiver systems. More particularly, this invention relates to improvements in systems for maintaining phase coincidence among a plurality of electromagnetic signals to be combined.

In the field of radio communications, it is often necessary or desirable to combine a plurality of frequency and/or phase modulated signals to improve reception reliability. For example, in a radio diversity receiving system, whether it be of the space, frequency or time diversity type, it is well recognized that the plurality of incoming frequency modulated waves must be combined in phase prior to demodulation so that common demodulation means may be utilized and an optimum signal-to-noise ratio obtained. If phase coincidence is not established, the incoming signals undergo transient cancellation and the combined signals exhibit self-induced fading characteristics which only compound the fading characteristics imparted to the individual signals by the transmitting media. The conventional procedure for placing diversity received electrical signals in phase coincidence (also known as phase coherence) is to arbitrarily select one of the incoming signals as the reference signal and to adjust the phase of the other signal or signals to coincide with the phase of the arbitrarily selected reference signal. U.S. Pat. No. 2,951,152 to Sichak discloses a predetection combining type radio diversity receiving system which employs an arbitrary reference signal type phase correction system of the type generally referred to above. However, this technique provides less than optimum reliability because the arbitrarily selected reference signal can and is as likely to fade as the corrected signal(s). Moreover, in many transmission systems all or part of the intelligence is transmitted by phase or frequency modulation of the radio signal carrier wave, and if an arbitrary reference signal is in a bad fade condition at a given instant, its instantaneous phase or frequency is not available to the system at that instant and the phase or frequency of the other signal(s) are often subjected to meaningless phase or frequency correction. Theoretically, in a dual diversity receiving system, the arbitrary reference signal will fade during one-half of the independent signal fades.

SUMMARY OF THE INVENTION

In view of the foregoing, it is an object of the present invention to provide an improved, more reliable system for maintaining a plurality of incoming electrical signals in phase coincidence.

Another object of this invention is to provide a phase adjusting system of the foregoing type whose accuracy and reliability are completely independent of the strength of any single incoming signal.

A further object of the present invention is the provision of a phase adjusting system of the foregoing type which maintains effective phase control so long as any one of the incoming signals is relatively strong at any given instant.

Still another object of this invention is to provide a system for placing a plurality of incoming signals in phase coincidence by shifting the phases of the individual signals to coincide with the phase of a reference signal which is generated in the system as a function of the phase of the strongest incoming signal.

A further object of this invention is to provide a phase adjustment system of the foregoing type wherein the strongest incoming signal is utilized as the reference signal.

Still another object of this invention is the provision of a phase adjustment system of the foregoing type wherein a reference signal is generated whose phase is a function of the phase difference between the incoming signals.

Another object of the present invention is to provide a radio diversity receiving system which includes phase adjusting circuitry of the foregoing type for placing the incoming signals in phase coincidence prior to demodulation.

BRIEF DESCRIPTION OF THE DRAWINGS

The foregoing and other objects, features, characteristics and advantages of the present invention will be apparent from the following description of certain typical embodiments thereof, taken together with the accompanying drawings, wherein like reference characters refer to like parts, and wherein.

DETAILED DESCRIPTION OF THE PREFERRED EMBODIMENTS

Figure 1:
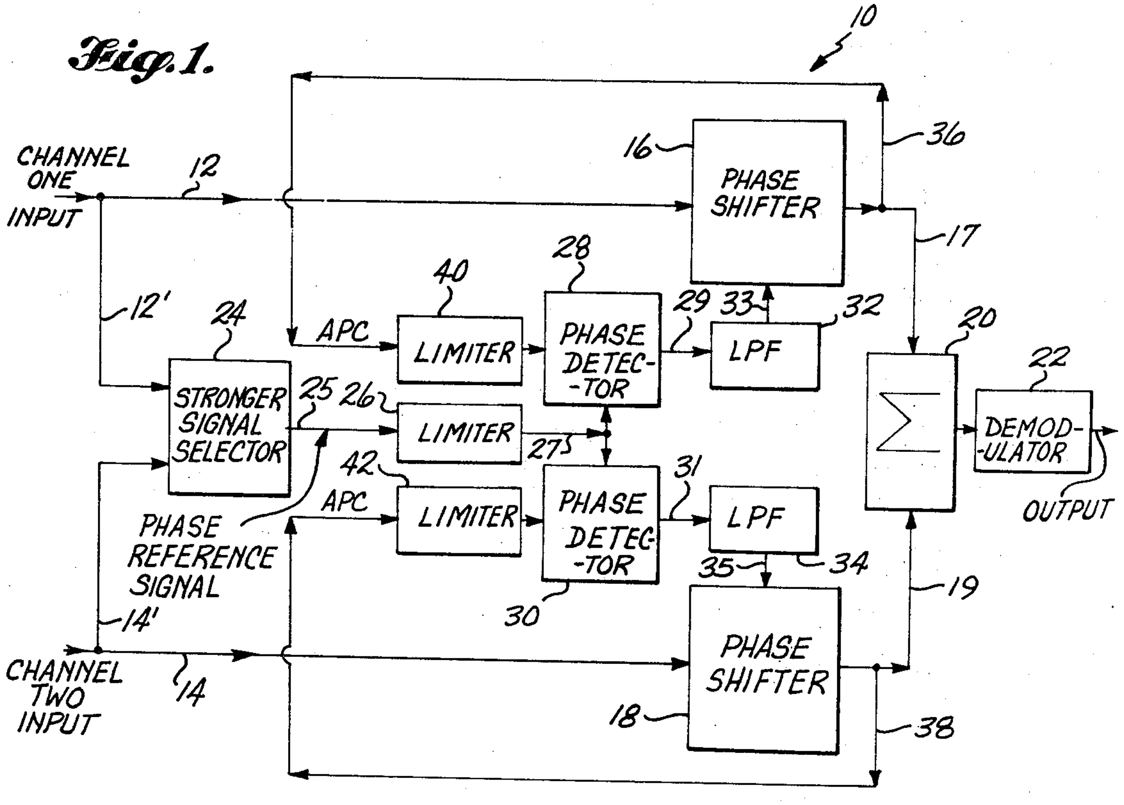
FIG. 1 is a block diagram showing a portion of a dual radio diversity receiving system which includes circuitry in accordance with the present invention for correcting the phases of the incoming signals to correspond to the phase of the stronger signal.

Referring now to the drawings, there is shown in FIG. 1 a portion of a pre-detection combining type of dual diversity radio receiving system which includes circuitry for placing the modulated incoming signals in phase coincidence before combining them. This circuit, generally indicated at 10, includes a pair of channels, bearing respective legends "CHANNEL ONE" and "CHANNEL TWO," one for each of the respective incoming signals from the respective diversity receiving means (not shown). These incoming signals are commonly at the IF frequency of the system and are fed (as indicated at 12, 14) to respective phase shifters 16, 18 associated with the signal inputs 12, 14. Said phase shifters 16, 18 are conventional per se and function to place the incoming signals in phase coincidence. The respective output signals 17, 19 from the phase shifters 16, 18 are combined in a summation circuit 20, and thereafter delivered to a demodulator circuit 22, both of which latter circuits are also conventional per se.

In each instance, respective portions 12', 14', of the signal inputs 12, 14 are delivered to a stronger signal selector circuit 24 (such as shown schematically in FIG. 3), which is designed to pass only the stronger incoming signal inputs 12, 14 are delivered to a stronger signal selector circuit 24 constitutes a phase reference signal which is passed through a limiter 26 to remove amplitude variation therein, and the limiter output 27 is then fed to a pair of phase detector circuits 28, 30, each of which generates a respective control signal 29, 31 representative of the phase of the phase reference signal 25. These control signals 29, 31 from the phase detector circuits 28, 30 are fed to respective low pass filters 32, 34, to minimize the noise components therein, and the respective filtered control signal outputs 33, 35 are then fed to the phase shifter circuits 16, 18 for correcting the phases of the modulated incoming signals 12, 14 which are also fed to the phase shifter circuits. The phase of the strongest incoming signal (12 or 14 as the case may be) will remain substantially unchanged since it is identical to the phase of the associated phase reference signal (33 or 35). Thus, the phase shifter circuits 16, 18 maintain or correct the phases of the respective incoming signal 12, 14 to coincide with the phase of the stronger signal.

The circuit 10 of FIG. 1 further includes feedback or so-called automatic phase control (APC) circuitry which comprises respective feedback signals 36, 38 from the respective phase shifters 16, 18, through respective limiters 40, 42 and the respective phase detectors 28, 30.

In practice, it is desirable that the stronger signal selector circuit 24 select the other incoming signal as the phase reference signal only when the other incoming signal becomes substantially stronger than the previously selected signal. Otherwise the circuit 24 may become confused when the previously nonselected signal becomes essentially equal to or only slightly greater than the previously selected signal. This manner of signal selection may be accomplished in a manner explained more fully below with reference to FIG. 3. What constitutes a "substantial" difference between the instantaneous strength of the stronger incoming signal and the instantaneous strength of the immediately previously selected incoming signal will vary with the type of phase correction circuit in which it is incorporated. For example, in the circuit 10 in FIG. 1, the stronger signal selector circuit 24 should select the strongest incoming signal only when it becomes at least about 1 or 2 db stronger than the other, previously selected signal.

Accordingly, when reference is made herein to a stronger signal selector circuit, it is to be understood that the circuit is preferably of the type which does not actually select the strongest incoming signal at a given instant unless the signal is stronger than the previously selected signal by a substantial amount, e.g. about 1 db.

Figure 3:
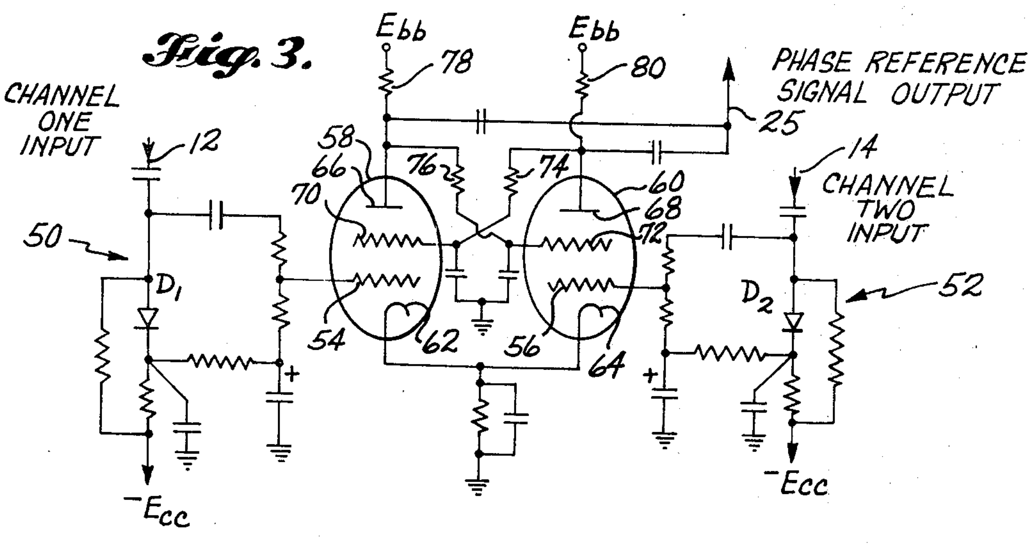
FIG. 3 is a schematic showing of a stronger signal selector circuit which may be incorporated in the systems shown in FIGS. 1 and 2.

One example of a stronger signal selector circuit which may be employed in the phase correction circuit 10 of FIG. 1 is illustrated in FIG. 3. The incoming signal portions 12' 14' are fed through input circuits including diodes D1 and D2 and voltage divider networks 50, 52. The networks 50 and 52 are connected to the respective control grids 54 and 56 of tetrodes or like tubes 58, 60. The tubes 58, 60 further include coupled cathodes 62, 64, plates 66, 68, and screen grids 70, 72, respectively. The screen grid 70 of the tube 58 is connected through a resistor 74 to the plate 68 of the tube 60, and the screen 72 of the tube 60 is similarly connected through a resistor 76 to the plate 66 of the tube 58. In input networks 50, 52, the respective diodes D1, D2 function as rectifiers, developing grid biasing positive voltages directly related to the respective strengths of the input signals 12, 14.

In operation, the incoming signals 12', 14' are converted to pulsating DC signals by diodes D1, D2 and voltage divider networks 50 and 52, to produce control voltages on the grids 54 and 56 of their respective tubes 58 and 60. For the sake of discussion, assume that the incoming signal 12' is the strongest initially. The signal 12' applied through the input network 50 will produce a relatively high positive control voltage at grid 54 of the tube 58 to establish and maintain the tube conductive, thereby increasing the voltage drop across the plate load resistor 78 and reducing the voltage of the plate 66. The weaker signal input 14' applied through the input network 52 will produce a less positive control voltage on the grid 56 of tube 60. In addition, the voltage of the screen grid 72 of tube 60 is relatively low because of the decreased voltage of the plate 66 to which it is coupled, and the voltage of the screen grid 70 of the tube 58 is relatively high because of the relatively high voltage of the plate 68 which it is coupled. The result of the increasing grid and screen voltages in the tube 58 and the decreasing grid and screen voltages in the tube 60 is to keep the tube 58 conductive and the tube 60 nonconductive, thereby passing only the input signal 12' as the phase reference signal output 25.

If the signal input 14' subsequently becomes only slightly greater than the channel 12 signal, the hysteresis loop characteristic of the initial reduced voltage of the screen grid 72 will not permit the signal 14 to make the tube 60 conductive and the tube 58 nonconductive. If the signal input 14' subsequently becomes significantly stronger than the channel 12 signal, however, the screen and grid voltages in the tube 60 increase relative to the screen and grid voltages of the tube 58, thereby turning the tube 58 "off" and the tube 60 "on." The amount by which the strength of the signal 14' must exceed the strength of the previously selected signal 12' to overcome the hysteresis loop characteristic initially produced by the reduced voltage of the screen 72 will depend upon the values selected for the resistors 74 and 76. As will be understood, the stronger signal selector circuit shown at FIG. 3 is in the nature of a bistable multivibrator or bistable "flip-flop" circuit, the design considerations of which are conventional per se.

Figures 2, 4:
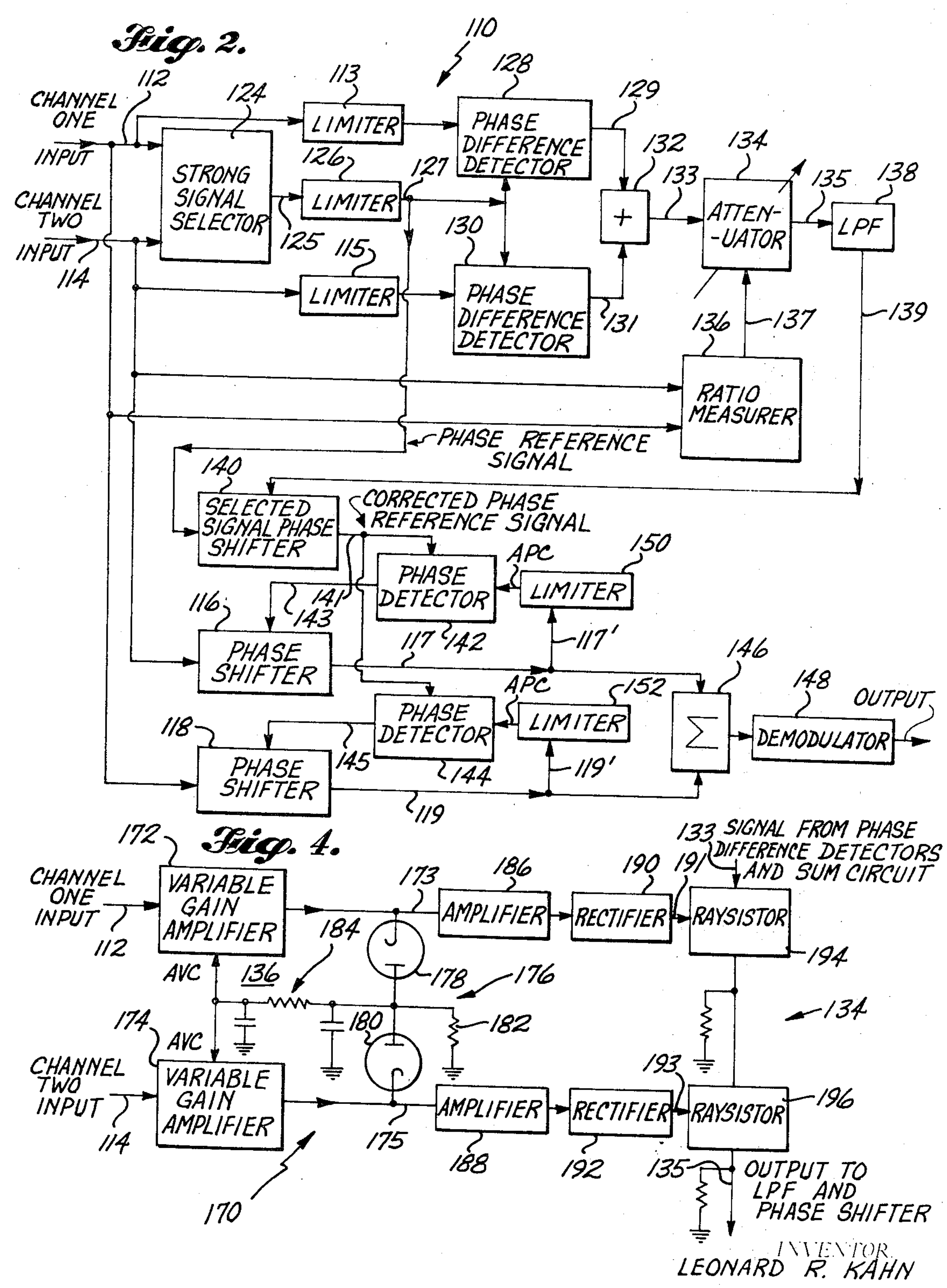
FIG. 2 is a block diagram of a dual radio diversity receiving system which includes circuitry for generating a reference signal representative of the ratio of the relative strength of the stronger and weaker incoming signals, and correcting the phases of the incoming signals to correspond to the phase of the reference signal.
FIG. 4 is a schematic showing of a ratio measurer-attenuator circuit which may be incorporated in the system shown in FIG. 2.

A modified form of the invention is shown at FIG. 2. In FIG. 2, the signal selection circuit 110 is like the circuit 10 of FIG. 1 to the extent that it automatically selects the stronger incoming signal and develops from a comparison of it with the incoming signals a phase correction signal (also termable a corrected phase reference signal) which is applied to both of the incoming signals to place them in phase coincidence. However, the corrected phase reference signal developed from the stronger signal selection is generated in a somewhat more sophisticated manner, taking into account the strength of the weaker incoming signal as well as the strength of the stronger incoming signal and developing a phase correction signal of intermediate phase relative to the phases of the two incoming signals. In FIG. 2, portions of the incoming signals 112, 114 are fed to respective phase shifters 116, 118, through limiters 113, 115 to phase difference detectors 128, 130, and to a stronger signal selector circuit 124. The stronger signal selector circuit 124, like the circuit 24 in FIGS. 1 and 3, functions to pass only the stronger signal as output 125. Preferably, however, the individual component values of the signal selector 126 circuit should be selected so as to render the bistable or "hysteresis" characteristic thereof more sensitive. For example, in FIG. 2, the signal selector circuit 124 should preferably be designed to select the other incoming signal if the other signal is about ½ db stronger than the previously selected incoming signal.

The selected signal output 125 from the signal selector circuit 124 is fed through a limiter 126 to remove any amplitude variations therein, and the limiter output 127 is then fed to the pair of phase difference detectors 128, 130 which suitably can be of the type described in my copending U.S. Pat. No. 3,337,808, granted Aug. 22, 1967. As earlier indicated, the phase difference detector circuits 128, 130 also receive respective portions of the incoming signals 112, 114. The output signals 129, 131 from circuits 128, 130 are representative of and a function of the difference in phase between the limited selected signal and the respective incoming signal. Of course the output of the phase difference detector associated with the stronger incoming signal will be zero, since the phase of the selected signal is identical to that of the stronger incoming signal.

The output signals 129, 131 from the phase difference detectors 128, 130 are combined in a summation circuit 132 and the output 133 produced is a phase reference signal representative of the arithmetic mean of the phases of the output signals 129, 131 from the phase difference detectors 128, 130. The output signal 133 from the summation circuit 132 is then fed to an attenuation circuit 134 which attenuates the signal by an amount depending upon the output signal 137 from a signal ratio measurer 136. The ratio measurer 136 receives portions of the incoming signals 112, 114 and generates an output signal 137 representative of the ratio of the strengths of the incoming signals. The ratio measurer-attenuator circuitry 134, 136 is suitably of a type shown in FIG. 4 and described more fully hereinafter.

The attenuated control signal 135 from the attenuator circuit 134 is fed through a low pass filter 138 to reduce the noise components thereof, and the filter output 139 is then passed to a selected signal phase shifter 140. The selected signal phase shifter 140 also receives a portion of the phase reference signal 127 from the stronger signal selector circuit 124 and its limiter 126, and corrects or adjusts its phase by an amount determined by the attenuated and filtered control signal 139 from the low pass filter 138. The output 141 of the selected signal phase shifter 140 constitutes a corrected phase reference signal which is fed to phase detectors 142, 144, each of which generates a respective control signal 143, 145 representative of the reference signal. The control signals 143, 145 are then fed to the respective phase shifters 116, 118 which change the phases of their respective incoming signals 112, 114 to the phase of the corrected phase reference signal.

The phase coincident output signals 117, 119 from the phase shifters 116, 118 are then fed to a summation circuit 146 which combines the signals and feeds the resultant signal to a demodulator circuit 148 from which signal output 149 is fed to a utilization means, in the conventional manner. Like the circuit 10 of FIG. 1, the FIG. 2 circuit 110 may be part of a dual radio diversity receiver system, with the incoming signals at IF frequency.

The circuit 110 of FIG. 2 also preferably includes feedback circuits for automatic phase control (APC), each of which comprises means feeding portions 117′, 119′ of the phase coincident incoming signals 117, 119 through limiters 150 and 152 and to the respective phase detectors 142, 144.

An example of one type of ratio measurer-attenuator circuit 170 which may be incorporated into the circuit 110 of FIG. 2 is shown in FIG. 4. This circuit, generally indicated at 170, includes a pair of variable gain amplifiers 172, 174 which receive and amplify respective portions of the incoming signals 112, 114, and feed a common diode load circuit, generally designated by numeral 176, for controlling the gain of the amplifiers 172, 174. The common diode load circuit 176 includes a pair of plate coupled diodes 178 and 180, a common load resistor 182 and an R-C network 184 which constitutes a low pass filter.

The portion of the circuit 170 described thus far functions as the automatic volume control (AVC) circuitry commonly used in diversity receiver systems. This AVC circuitry functions to hold the gains of the variable gain amplifiers 172 and 174 equal, and at a relatively constant value which is determined by the strength of the strongest signal. As the strength of the dominant signal increases, the gain in each amplifier 172, 174 is lowered. This operation results from the employment of diodes 178, 180 as a common load, with the respective diode 178 or 180 receiving the stronger input signal 173, 175 determining the amplitude of the AVC voltage fed to the VG amplifier 172, 174.

For example, the individual component values of the circuit 176 may be selected so that the stronger signal will always produce a 10-volt signal therein, and if the strength of the weaker signal is one-half the strength of the stronger signal, it will produce a 5-volt signal. Thus, the individual incoming signals from channels 112 and 114 will always have the same ratio of amplitude at the outputs of the amplifiers 172 and 174 that they had at the inputs, and the level of the strongest signal will be maintained at a constant value.

The outputs 173, 175 of the variable gain amplifiers 172, 174 are then fed to the respective amplifiers 186, 188, rectifiers 190, 192 and Raysistor circuits 194, 196. The Raysistor circuits 194, 196 are voltage divider circuits which include Raysistors, a commercially available component whose resistance is inversely related to the voltage fed to it. Thus, the weaker incoming signal will always produce more attenuation in its respective Raysistor circuit than the stronger signal produces in its Raysistor circuit. Optimally, these Raysistor circuits maintain an attenuation ratio in direct relation to the signal strengths fed thereto, i.e., if the input 191 is at twice the strength of the input 193, then Raysistor circuit 196 has twice the attenuation of Raysistor circuit 194. This attenuation ratio, acting in conjunction with the variable gain amplifiers 172, 174, provide a "ratio squared" relation between the incoming input signals 112, 114 and the combined output signal 198 components in a manner analogous to the "ratio squarer" optimal combining system disclosed and claimed in my U.S. Pat. No. 3,030,503, to which reference may be had for a more comprehensive consideration of the advantages of this mode of diversity signal combining.

In the circuit shown in FIG. 4, the ratio squarer type combining of the phases of the incoming signals 112, 114 is manifested by selective attenuation of the phase control signal 133 (FIG. 2). For this purpose, the control signal 133 from the summation circuit 132 is fed to the Raysistor circuit 194 and modified by the Raysistor circuits (Which are collectively shown in FIG. 2 as attenuator 134) to provide the attenuated control signal 135 which (as shown in FIG. 2) is fed to low pass filter 138 and thence to the selected signal phase shift 140.

The circuit 110 of FIG. 2, whether provided with the ratio measurer and attenuator circuit shown at FIG. 4, will be seen as providing in many instances a combined signal having a better signal-to-noise ratio than the signal-to-noise ratio of either incoming signal alone.

As will also be understood, the respective summation circuits (circuit 20 in FIG. 1 and circuit 146 in FIG. 2), by application of design considerations known per se, can operate to effect simple linear addition or combining of the phase coincident signals fed thereto, or can combine the signals in any other desired manner, such as the so-called ratio squarer mode of combining taught in my aforementioned U.S. Pat. 3,030,503, for example.

One important advantage of the circuit 110 of FIG. 2 is that it is free of phase transient problems which are inherent in the circuit 10 of FIG. 1. For example, if the incoming signals 112, 114 in the circuit 110 are approximately equal in amplitude and 80° apart in phase, the circuit will produce a reference signal having a phase approximately half-way between the phases of the incoming signals, and this phase reference signal will remain generally constant as the amplitude of the initially weaker signal increases and overcomes the amplitude of the initially stronger signal. Under the circumstances, the stronger signal selector circuit 24 in FIG. 1 will instantaneously shift the phase of the output signal by 80°, thereby creating phase transient problems. For this reason, circuit 24 should be designed to be less sensitive (e.g., 1 or 2 db versus ½ db signal strength difference) than stronger signal selector circuit 124 in FIG. 2 to reduce the occurrences of change as to the signal selected for reference purposes.

While the circuits 10 and 110 in FIGS. 1 and 2, respectively, have been illustrated and described herein for placing two incoming signals in phase coincidence, it will be understood that these circuits can readily be modified to place any number of incoming signals, i.e., three or more, in phase coincidence. As will also be understood, in the FIG. 2 circuit the attenuator 134 and ratio measurer 136 can be omitted from the circuitry if the diversity system need not include the "ratio squarer" refinement, in which case the corrected phase reference signal 141 represents simply an average of the phases of the combined signals.

From the foregoing, various further modifications, circuit arrangements, and adaptations characteristic of the present invention will be aparent to those skilled in the art to which the invention is addressed, within the scope of the following claims.

What is claimed is:

1. Electronic circuit means for placing a plurality of incoming diversity signals in substantial phase coincidence, comprising:
means comparing the incoming diversity signals and determining the phase of the strongest signal;
means producing a phase reference signal the phase of which is a function of the phase of whichever of the incoming diversity signals is the strongest signal; and
means utilizing said phase reference signal to establish the phases of the diversity signals in substantial phase coincidence.

2. Electronic circuit means according to claim 1, wherein the means producing the phase reference signal includes separate phase detector circuits associated with each of the incoming signals, and wherein the means determining the phase of the strongest diversity signal comprises signal selector means including a bistable flip-flop circuit receiving said diversity signals and passing only the strongest thereof.

3. Electronic circuit means according to claim 2, further comprising automatic phase control means including a feedback circuit passing a portion of each phase adjusted signal to its respective phase detector circuit.

4. Electronic circuit means for placing a plurality of diversity signals of like frequency in substantial phase coincidence, comprising:
means determining the phase of each diversity signal;
means comparing the phases of the various incoming diversity signals and developing therefrom a phase reference signal of like frequency, the phase of which is a function of and has a phase intermediate of the phase of the strongest diversity signal and the weaker diversity signal(s); and
means for adjusting the phases of the various diversity signals responsive to said phase reference signal to establish the phases of the various diversity signals in substantial phase coincidence.

5. A radio diversity receiving system comprising:
a plurality of receiving channels each for a respective incoming diversity signal;
means comparing the incoming diversity signals and determining the phase of the strongest signal;
means producing a phase reference signal the phase of which is a function of the phase of whichever of the incoming diversity signals is the strongest signal;
means utilizing said phase reference signal to establish the phases of the incoming signals in substantial phase coincidence;
means combining and demodulating the phase coincident signals; and
means utilizing the demodulated combined signal output.

6. A radio diversity receiving system comprising:
a plurality of signal channels each producing a respective diversity signal of like frequency;
means determining the phase of each such diversity signal;
means comparing the phases of the various such diversity signals and developing therefrom a phase reference signal of like frequency, the phase of which is a function of and has a phase intermediate of the phase of the strongest diversity signal and the weaker diversity signal(s);
means for adjusting the phases of the various diversity signals responsive to said phase reference signal to establish the phases of the various diversity signals in substantial phase coincidence;
means combining and demodulating the phase coincident signals; and
means utilizing the demodulated combined signal output.

7. Electronic circuit means for placing a plurality of incoming electrical signals in phase coincidence, comprising:
signal seletor means selecting the strongest incoming signal;
means deriving from the selected strongest signal a phase reference signal having a phase angle falling in the range between the phase angle of the selected signal and the arithmetic mean of the phase angles of all the incoming signals; and
phase shift means correcting the phases of the various incoming signals to correspond to the phase of such phase reference signal.

8. Electronic circuit means according to claim 7, wherein said reference signal generating means comprises means generating a control signal representative of the phase difference between the incoming signals, and phase shift means responsive to such control signal for shifting the phase of the selected signal from said signal selector means by an amount proportional to the amplitude of such control signal.

9. Electronic circuit means according to claim 8, wherein such phase reference signal deriving means comprises means deriving a reference signal having a phase angle substantially equal to the phase angle of the strongest incoming signal.

10. Electronic circuit means according to claim 7, wherein such phase reference signal deriving means comprises means deriving a reference signal having a phase angle substantially equal to the phase angle of the strongest incoming signal.

11. Electronic circuit means for placing a plurality of incoming electrical signals in phase coincidence, comprising:
signal selector means selecting the strongest incoming signal;
separate phase difference detector means associated with each of the incoming signals and responsive to the selected signal from said signal selector means and each generating an output signal representative of the phase difference between its associated incoming signal and the selected signal;
summation means combining the outputs of said separate phase difference detector means and producing a control signal representative of the arithmetic means of the output signals from said separate phase difference detector means;
attenuator means responsive to the control signal from said summation means and to the various incoming signals and generating a control signal attenuated in relation to the ratio of the relative strengths of the stronger and weaker incoming signals;

selected signal phase shift means responsive to the attenuated control signal from said attenuator means and to the selected signal from said signal selector means and shifting the phase of the selected signal by an amount proportional to the strength of the attenuated control signal; said phase-shifted attenuated control signal constituting a corrected phase reference signal;

phase detector means responsive to the corrected phase reference signal from said selected signal phase shift means and generating an output signal representative of the phase of said corrected phase reference signal; and separate incoming signal phase shift means associated with each of the incoming signals and responsive to the output signal from said phase detector means and shifting the phase of their associated incoming signal to correspond to the phase of the phase corrected reference signal.

12. Electronic circuit means according to claim 11, wherein said stronger signal selector means comprises a bistable flip-flop circuit for receiving said incoming signals and passing only the strongest incoming signal.

13. Electronic circuit means according to claim 11, wherein said attenuator means comprises means generating a control signal attenuated in direct relation to the ratio of the relative strengths of the incoming signals.

14. Electronic circuit means according to claim 11, wherein said phase detector means comprises separate phase detector circuits associated with each of the incoming signals.

15. Electronic circuit means according to claim 14, and further including automatic phase control means comprising means for feeding back a portion of each of the phase corrected signals from its respective phase shift means to its respective phase detector circuit.

16. In a diversity radio receiver system comprising a plurality of receiving channels each developing a diversity signal of like frequency and of a strength determined by the manner of transmission of the diversity signal to the associated receiver, means for placing the diversity signals in substantial phase coincidence and combining the phase coincident signals, means for demodulating the combined signal, and a utilization means to which the combined demodulated signal output is applied; the improvement wherein said means for placing the diversity signals in substantial phase coincidence comprises: (1) means establishing a phase reference signal of like frequency, the phase of which is a function of the phase of the strongest diversity signal and the phase(s) of the weaker diversity signal or signals, and (2) means adjusting the phases of the various diversity signals to be substantially coherent with the phase of the said phase reference signal.

References Cited

UNITED STATES PATENTS

| | | | |
|---|---|---|---|
| 2,955,199 | 10/1960 | Mindes | 325—369 XR |
| 2,685,643 | 8/1954 | Fisk | 325—304 |
| 2,951,152 | 8/1960 | Sichak | 325—369 XR |
| 3,251,062 | 5/1966 | Ghose | 325—369 XR |

ROBERT L. GRIFFIN, Primary Examiner

K. W. WEINSTEIN, Assistant Examiner

U.S. Cl. X.R.

325—305, 368, 369